(12) United States Patent
Bigot et al.

(10) Patent No.: US 9,835,796 B2
(45) Date of Patent: Dec. 5, 2017

(54) MULTIMODE OPTICAL FIBER WITH HIGH BANDWIDTH OVER AN EXTENDED WAVELENGTH RANGE, AND CORRESPONDING MULTIMODE OPTICAL SYSTEM

(71) Applicant: Draka Comteq B.V., Amsterdam (NL)

(72) Inventors: Marianne Bigot, Paron (FR); Denis Molin, Paron (FR); Pierre Sillard, Paron (FR)

(73) Assignee: Draka Comteq, B.V., Amsterdam (NL)

( * ) Notice: Subject to any disclaimer, the term of this patent is extended or adjusted under 35 U.S.C. 154(b) by 0 days.

(21) Appl. No.: 15/586,664

(22) Filed: May 4, 2017

(65) Prior Publication Data

US 2017/0235044 A1    Aug. 17, 2017

Related U.S. Application Data

(63) Continuation of application No. 15/120,832, filed as application No. PCT/IB2014/000503 on Feb. 28, 2014, now Pat. No. 9,678,270.

(51) Int. Cl.
*G02B 6/028* (2006.01)
*G02B 6/036* (2006.01)

(52) U.S. Cl.
CPC ......... *G02B 6/0288* (2013.01); *G02B 6/0365* (2013.01); *G02B 6/03627* (2013.01)

(58) Field of Classification Search
CPC . G02B 6/0288; G02B 6/0365; G02B 6/03627
See application file for complete search history.

(56) References Cited

U.S. PATENT DOCUMENTS 7,315,677 B1    1/2008  Li et al.
7,421,172 B2    9/2008  Matthijse et al.
(Continued)

FOREIGN PATENT DOCUMENTS

JP    2005-107514 A    4/2005
WO    2015/128691 A1    9/2015

OTHER PUBLICATIONS

International Search Report in counterpart International Application No. PCT/IB2014/000503 dated Oct. 30, 2014, pp. 1-2.
(Continued)

*Primary Examiner* — Rhonda Peace
(74) *Attorney, Agent, or Firm* — Additon, Higgins & Pendleton, P.A.

(57) ABSTRACT

The invention concerns a multimode optical fiber, with a graded-index core co-doped with at least fluorine F and germanium $GeO_2$ and a refractive index profile with at least two $\alpha$-values. According to the invention, the concentration of fluorine F at the core center ($[F]_{r=0}$) is between 0 and 3 wt % and the concentration of fluorine F at the core outer radius ($[F]_{r=a}$) is between 0.5 wt % and 5.5 wt %, with $[F]_{r=a}-[F]_{r=0}>0.4$ wt %. For wavelengths comprised between 850 nm and 1100 nm, said multimode optical fiber has an overfilled launch bandwidth (OFL-BW) greater than 3500 MHz·km and a calculated effective modal bandwidth (EMBc) greater than 4700 MHz·km over a continuous operating wavelength range greater than 150 nm.

20 Claims, 3 Drawing Sheets

(56) References Cited

U.S. PATENT DOCUMENTS

| | | |
|---|---|---|
| 8,391,661 B2 | 3/2013 | Molin et al. |
| 8,879,920 B2 | 11/2014 | Lumineau et al. |
| 8,891,074 B2 | 11/2014 | Molin et al. |
| 8,965,163 B2 | 2/2015 | Bookbinder et al. |
| 9,014,525 B2 | 4/2015 | Molin et al. |
| 9,678,270 B2 * | 6/2017 | Bigot .................. G02B 6/0288 |
| 2005/0053351 A1 | 3/2005 | Guan et al. |
| 2013/0077926 A1 | 3/2013 | Bickham et al. |
| 2013/0114935 A1 | 5/2013 | Bookbinder et al. |
| 2016/0363725 A1 | 12/2016 | Bigot et al. |

OTHER PUBLICATIONS

International Preliminary Report on Patentability in counterpart International Application No. PCT/IB2014/000503 dated Sep. 6, 2016, pp. 1-5.

* cited by examiner

MULTIMODE OPTICAL FIBER WITH HIGH BANDWIDTH OVER AN EXTENDED WAVELENGTH RANGE, AND CORRESPONDING MULTIMODE OPTICAL SYSTEM

1. CROSS-REFERENCE TO PRIORITY APPLICATIONS

This application is a continuation of U.S. patent application Ser. No. 15/120,832 for Multimode Optical Fiber with High Bandwidth over an Extended Wavelength Range, and Corresponding Multimode Optical System, filed Aug. 23, 2016, (and published Dec. 15, 2016, as Publication No. 2016/0363725 A1), which itself is the U.S. national-stage application of International Patent Application No. PCT/IB2014/000503 for Multimode Optical Fiber with High Bandwidth over an Extended Wavelength Range, and Corresponding Multimode Optical System, filed Feb. 28, 2014, (and published Sep. 3, 2015, as International Publication No. WO 2015/128691 A1). Each of the foregoing patent applications and patent application publications is hereby incorporated by reference in its entirety.

2. FIELD OF THE INVENTION

The present invention relates to the field of optical fiber transmissions, and more specifically, to multimode fibers used in relative long reach and high bitrate systems. More specifically, the invention relates to multimode optical fibers designed to fulfill the high bit rate requirements of next generation 400 GbE systems.

3. BACKGROUND

Multimode fibers are successfully used in high-speed data networks together with high-speed sources that are typically using transversally multimode vertical cavity surface emitting lasers, more simply called VCSELs. Multimode fibers operating at 850 nm and 1300 nm are well known.

Multimode fibers are affected by intermodal dispersion, which results from the fact that, in a multimode fiber, for a particular wavelength, several optical modes propagate simultaneously along the fiber, carrying the same information, but travelling with different propagation velocities. Modal dispersion is expressed in terms of Differential Mode Delay (DMD), which is a measure of the difference in pulse delay (ps/m) between the fastest and slowest modes traversing the fiber.

In order to minimize modal dispersion, the multimode optical fibers used in data communications generally comprise a core, generally doped with Germanium, and showing a refractive index that decreases progressively going from the center of the fiber to its junction with a cladding. In general, the index profile is given by a relationship known as the "α profile," as follows:

$$n(r) = n_0 \sqrt{1 - 2\Delta\left(\frac{r}{a}\right)^\alpha} \text{ for } r \leq a,$$

where:
$n_0$ is a refractive index on an optical axis of a fiber;
r is a distance from said optical axis;
a is a radius of the core of said fiber;

Δ is a non-dimensional parameter, indicative of an index difference between the core and a cladding of the fiber; and
α is a non-dimensional parameter, indicative of a shape of the index profile.

When a light signal propagates in such a core having a graded index, the different modes experience a different propagation medium, which affects their speed of propagation differently. By adjusting the value of the parameter α, it is thus possible to theoretically obtain a group velocity, which is virtually equal for all the modes and thus a reduced intermodal dispersion for a particular wavelength. However, an optimum value of the parameter α is valid for a particular wavelength only.

Graded-index alpha-shape profile and core-cladding interface of the multimode fibers are optimized to operate with GaAs VCSELs that can be directly current-modulated to support 10 Gbps and 25 Gbps systems at 850 nm. Backwards compatibility for use at 1300 nm with LED sources is also guaranteed for most of the 50 µm and 62.5 µm multimode fibers currently in use. The performances of such laser-optimized, high bandwidth 50 µm multimode fibers, also called OM4 fibers, have been standardized by the International Standardization Organization in document ISO/IEC 11801, as well as in TIA/EIA 492AAAD standard.

However, the explosion in demand for bandwidth in enterprise networks is driving an urgent need for higher Ethernet network speeds. To further increase the data bit rate for next generation 400 GbE systems, the use of InGaAs VCSELs operating at 40-56 Gb/s between around 850 nm and 1200 nm combined with wavelength division multiplexing appears as a promising solution, as it will allow achieving both higher speed and higher reliability. In such configuration, OM4 performances are thus required over an extended transmission bandwidth, compared to off-the-shelf OM4 M M Fs, optimized at 850 nm.

Since the optimum value of alpha is wavelength dependent, the transmission bandwidth generally becomes significantly small at other wavelengths than the optimum wavelength. The one skilled in the art knows well that it is possible to use dopants like Phosphorus (P) or Fluorine (F) to modify the refractive index of silica $SiO_2$, and thus allow reducing the wavelength dependence of the optimum alpha.

Patent document U.S. Pat. No. 7,421,172 in the name of Draka Comteq B. V. discloses multimode optical fibers, which graded-index cores are built up by using $GeO_2$ and F as dopants in $SiO_2$. By varying the concentration of dopants over the core radius, the intermode dispersion characteristics of the multimode optical fibers can be adapted in such a manner that the bandwidth is less wavelength-dependent.

Although such a co-doping of graded-index multimode fibers allows achieving a higher bandwidth over a wider wavelength range than for previously known multimode fibers, such a bandwidth is not high enough to meet the demand of high bit rate for next generation systems.

Document U.S. Pat. No. 8,391,661 in the name of Draka Comteq B. V. discloses a multimode fiber with higher modal bandwidth and larger numerical aperture than multimode fibers of the prior art. To this end, such a multimode optical fiber includes a central core that follows a modified power-law equation with an exponent alpha (e.g. an alpha parameter) that depends on radial position within the optical fiber. The alpha parameter has at least two different values along the central core's radius. A first alpha parameter value $\alpha_1$ controls the shape of the graded index core in an inner zone of the central core, and a second alpha parameter value $\alpha_2$ controls the shape of the graded-index core in an outer zone of the central core. The second alpha parameter value is typically less than the first alpha parameter value. The graded-index core profile and its first derivative are typically substantially continuous over the width of the graded-index core. The central core's graded-index profile has a delta Δ value of 1.9 percent or more.

In this U.S. Pat. No. 8,391,661 document, the use of graded index profile with two or more alpha values aims at designing multimode optical fibers having a large numerical aperture NA. However, such high NA multimode optical fibers have bandwidths, which are optimized for a single wavelength (typically 850 nm). They do not allow reaching OM4 performances over an extended transmission bandwidth.

Document U.S. Pat. No. 7,315,677 discloses multimode optical fibers comprising Germania (GeO2) and Fluorine co-doped in the core of the fiber. The dopant concentration profiles are defined by a pair of alpha parameters, $\alpha_1$ and $\alpha_2$. The operating window, or bandwidth window, is enlarged and attenuation, or loss, is low. In some embodiments, two operating windows are available for transmission.

Document U.S. Pat. No. 7,315,677 hence teaches "double alpha profiles" based on co-doping, where each dopant profile is the sum of two alpha profiles with same $\alpha_1$ and $\alpha_2$ used for both compounds. The alpha definition is different from the definition of alpha profile commonly used. Such profiles are difficult to produce from a process point of view. Actually, the concentration shape of Ge and F are difficult to control.

More generally, some solutions consisting of using full-fluorine or low Ge doped concept have been proposed in the literature and in patents. Some of these solutions also teach double alpha profiles, where each dopant profile uses its own alpha. But such solutions require having an outer cladding with a refractive index much lower than the refractive index of $SiO_2$. Thus, for deposition processes like MCVD (for "Modified Chemical Vapor Deposition") and PCVD (for "Plasma Chemical Vapor Deposition"), which require depositing the different doped layers within a substrate tube, such solutions are quite complex. It is necessary to manage leakage losses and/or to add an outer depressed-cladding. Furthermore, with a Fluorine-doped outer cladding, it becomes difficult to consider "trench-assisted" concepts that require to further F-dope the cladding. It would require F concentration levels that cannot be reached with the existing deposition processes.

It would hence be desirable to design a multimode optical fibre adapted to wideband applications and showing improvements over the prior art.

More precisely, it would be desirable to design a multimode optical fibre, showing OM4 performance increased to multiple wavelengths or to a wavelength-operating window larger than 150 nm.

It would also be desirable to design such a multimode optical fiber, which is easy to manufacture, notably through the use of deposition process like MCVD and PCVD.

4. SUMMARY

In one particular embodiment of the invention, a multimode optical fiber is proposed, which comprises:
a central core surrounded by an outer optical cladding, said central core having (i) an outer radius a, (ii) a transition radius $r_t$ that is less than the outer radius a, (iii) a maximum refractive index $n_0$, (iv) a minimum refractive index $n_{Cl}$, and (v) a graded-index profile n(r) that is a function of the radial distance r from the center of said central core, wherein said central core is co-doped with at least fluorine F and germanium $GeO_2$, wherein said central core's graded-index profile n(r) is defined by the following equation:

$$n(r) = n_0 \sqrt{1 - 2\Delta\left(\frac{r}{a}\right)^{\alpha(r)}}$$

where:

$$\Delta = \frac{(n_0^2 - n_{Cl}^2)}{2n_0^2}$$

wherein the alpha parameter α(r) is a function of the radial distance r from the center of said central core, said alpha parameter α(r) having two or more different values along radial positions from said central core's center to said central core's outer radius a;

wherein the weight ratio of fluorine F at the core center ($[F]_{r=0}$) is between 0 and 3 wt % and the weight ratio of fluorine F at the core outer radius ($[F]_{r=a}$) is between 0.5 wt % and 5.5 wt %, with $[F]_{r=a}$-$[F]_{r=0}$>0.4 wt %.

The present invention thus relies on a novel and inventive approach of multimode optical fibers. Actually, it proposes a multimode optical fiber adapted to wideband applications using a high co-doping level of both fluorine and germanium, hence allowing designing refractive index profiles with the refractive index of the outer part of the graded-index core close to the refractive index of pure silica $SiO_2$. The high variations of composition with radius entail to use an alpha parameter that varies with core radius.

Such an invention hence enables to design multimode fibers with OM4 performances over an operating window larger than 150 nm centered on the optimum operating wavelength.

Actually, according to an aspect of the present invention, for wavelengths comprised between 850 nm and 1100 nm, said multimode optical fiber has an overfilled launch bandwidth (OFL-BW) greater than 3500 MHz·km over a continuous operating wavelength range greater than 150 nm.

According to another aspect of the present invention, for wavelengths comprised between 850 nm and 1100 nm, said multimode optical fiber has a calculated effective modal bandwidth (EMBc) greater than 4700 M Hz·km over a continuous operating wavelength range greater than 150 nm.

According to an aspect of the present invention, Δ is between 0.7% and 1.5%.

According to another aspect of the present invention, the mole fraction of $GeO_2$ at the core outer radius ($[Ge]_{r=a}$) is between 1.5 mol % and 17.5 mol %.

According to another aspect of the present invention, the mole fraction of $GeO_2$ at the core center ($[Ge]_{r=0}$) is between 9.5 mol % and 30 mol %.

According to yet another aspect, for a radial position less than said central core's transition radius $r_t$, the alpha-parameter α(r) has a first value $\alpha_1$ and, for a radial position greater than said central core's transition radius $r_t$, the alpha-parameter α(r) has a second distinct value $\alpha_2$.

According to another aspect, said central core's graded-index profile is defined by the following power equation:

$$n(r) = \begin{cases} n_1 \cdot \sqrt{1 - 2\Delta_1\left(\frac{r}{a}\right)^{\alpha_1}} & 0 \leq r \leq r_t \\ n_2 \cdot \sqrt{1 - 2\Delta_2\left(\frac{r}{a}\right)^{\alpha_2}} & r_t \leq r \leq a \\ n_{Cl}(r) & a < r \end{cases}$$

where $$\Delta_1 = \frac{\alpha_2 \Delta \left(\frac{r_t}{a}\right)^{\alpha_2 - \alpha_1}}{\alpha_1 + (\alpha_2 - \alpha_1)\left(\frac{r_t}{a}\right)^{\alpha_2}},$$

$$\Delta_2 = \frac{\alpha_1 \Delta}{\alpha_1 + (1 - 2\Delta)(\alpha_2 - \alpha_1)\left(\frac{r_t}{a}\right)^{\alpha_2}},$$

$$n_1 = \frac{n_{Cl}}{\sqrt{1 - 2\Delta}}, \text{ and}$$

$$n_2 = n_{Cl} \cdot \sqrt{\frac{(1 - 2\Delta)(\alpha_1 - \alpha_2)\left(\frac{r_t}{a}\right)^{\alpha_2} - \alpha_1}{(1 - 2\Delta)\left[(\alpha_1 - \alpha_2)\left(\frac{r_t}{a}\right)^{\alpha_2} - \alpha_1\right]}}.$$

According to another aspect, the first alpha-value $\alpha_1$ is between about 1.945 and 2.07.

According to yet another aspect, the second alpha-value $\alpha_2$ is between about 1.945 and 2.07 with $0.001 \leq |\alpha_1 - \alpha_2| \leq 0.1$.

According to yet another aspect, said parameter $r_t$ of the transition radius is between about 0.2 and 0.9.

According to yet another aspect, said center core's outer radius a is between about 20 μm and 40 μm.

According to yet another aspect, the weight ratio of fluorine F [F] (r) is a function of the radial distance r from the center of said central core expressed as:

$$[F](r) = [F](0) + \left(\frac{r}{a}\right)^p \cdot ([F](a) - [F](0)),$$

where p is a constant substantially equal to 2.

According to yet another aspect, such a multimode fiber follows the following law: $0.017([F](\alpha) - [F](0)) - 0.107 < |\alpha_1 - \alpha_2| < 0.017([F](\alpha) - [F](0)) + 0.006$ with $\alpha_1 \neq \alpha_2$.

According to yet another aspect, such a multimode fiber also follows the following law:

$$|\alpha_1 - \alpha_2| > 0.001 \times e^{0.7\delta_c} \text{ with}$$

$$\delta_c = \frac{[F](a) - [F](0)}{[Ge](0) - [Ge](a)} \text{ expressed in wt/mol.}$$

According to another embodiment, the weight ratio of fluorine F at the core outer radius ($[F]_{r=\alpha}$) is between 0.85 wt % and 5.5 wt %, with $[F]_{r=\alpha} - [F]_{r=0} > 0.85$ w t%.

Moreover, for wavelengths comprised between 800 nm and 1200 nm, said multimode optical fiber has an overfilled launch bandwidth (OFL-BW) greater than 3500 MHz·km over a continuous operating wavelength range greater than 175 nm.

Besides, for wavelengths comprised between 800 nm and 1200 nm, said multimode optical fiber has a calculated effective modal bandwidth (EMBc) greater than 4700 MHz·km over a continuous operating wavelength range greater than 175 nm.

According to yet another embodiment, the weight ratio of fluorine F at the core outer radius ($[F]_{r=\alpha}$) is between 2.0 wt % and 5.5 wt %, with $[F]_{r=\alpha} - [F]_{r=0} > 1.8$ wt %.

Moreover, for wavelengths comprised between 750 nm and 1300 nm, said multimode optical fiber has an overfilled launch bandwidth (OFL-BW) greater than 3500 MHz·km over a continuous operating wavelength range greater than 200 nm.

Besides, for wavelengths comprised between 750 nm and 1300 nm, said multimode optical fiber has a calculated effective modal bandwidth (EMBc) greater than 4700 MHz·km over a continuous operating wavelength range greater than 200 nm.

In a special embodiment of a multimode optical fiber according to the present invention, said optical cladding comprises a region of depressed refractive index $n_{trench}$, called a trench, surrounding the optical core, said trench having a width $w_2$. Preferentially, said trench width $w_2$ is between about 0.4 μm and 2.5 μm and the trench-cladding index difference $\Delta n_2 = n_{trench} - n_{Cl}$ is between about $-2.0 \times 10^{-3}$ and 0.

In another special embodiment of a multimode optical fiber according to the present invention, said optical cladding comprises an inner cladding layer directly surrounding said core, said inner cladding layer having a width $w_2$ and a refractive index difference $\Delta n_2$, and a region of depressed refractive index $n_{trench}$, called a trench, surrounding said inner cladding layer, said trench having a width $w_3$ and a refractive index difference $\Delta n_3 = n_{trench} - n_{Cl}$. Preferentially, said inner cladding layer width $w_2$ is between about 0.4 μm and 2.5 μm and said refractive index difference $\Delta n_2$ is between about $-1.5 \times 10^{-3}$ and $1.5 \times 10^{-3}$, and said trench width $w_3$ is between about 1.5 μm and 5.0 μm and said refractive index difference $\Delta n_3$ is between about $-7.5 \times 10^{-3}$ and $-1.5 \times 10^{-3}$.

The present invention furthermore relates to a multimode optical system comprising at least a portion of a multimode optical fiber as described above.

5. BRIEF DESCRPTION OF THE DRAWINGS

The invention can be better understood with reference to the following description and drawings, given by way of example and not limiting the scope of protection, and in which.

The components in the figures are not necessarily to scale, emphasis instead being placed upon illustrating the principles of the invention.

Throughout this document, the terms germanium, Ge and $GeO_2$ are equally used to refer to the dopant $GeO_2$.

6. DETAILED DESCRIPTION

Throughout this document, the terms operating window designate the range of wavelengths for which the multimode optical fiber exhibits a bandwidth larger than the value defined in the OM4 specification. Depending on the source used, the following examples either consider a calculated effective modal bandwidth EMBc>4700 MHz·km or an overfilled launch bandwidth OFL-BW>3500 MHz·km. The method defined in the FOTP-220 standard and IEC 60793-1-49 standard is used to compute the calculated effective modal bandwidth EMBc from the DMD (for "Differential Mode Delay") measurements, whatever the wavelength used (same weight functions).

The multimode fiber according to an embodiment of the invention comprises a central core surrounded by an outer optical cladding. The central core has (i) an outer radius a, (ii) a transition radius $r_t$ that is less than the outer radius a, (iii) a maximum refractive index $n_0$, (iv) a minimum refractive index $n_\alpha$, and (v) a graded-index profile n(r) that is a function of the radial distance r from the center of said central core.

The core and the cladding form the glass portion of the optical fiber. In some embodiments, the cladding is coated with one or more coatings, for example with an acrylate polymer.

In order to extend the operating window over more than 150 nm while keeping a refractive index substantially equal to the refractive index of pure silica, both high concentration of Fluorine and germanium are required in the graded-index central core. The weight ratio [F] (r) between the fluorine and all the constituents of the doped matrix of the central core may be expressed as a function of the radial distance r from the center of the fiber as follows:

$$[F](r) = [F](0) + \left(\frac{r}{a}\right)^p \cdot ([F](a) - [F](0))$$

with [F] (0) the weight ratio of fluorine at the center of the core, [F] (α) the weight ratio of Fluorine at the end of the alpha profile of radius a and p a constant substantially equal to 2.

Figure 1:
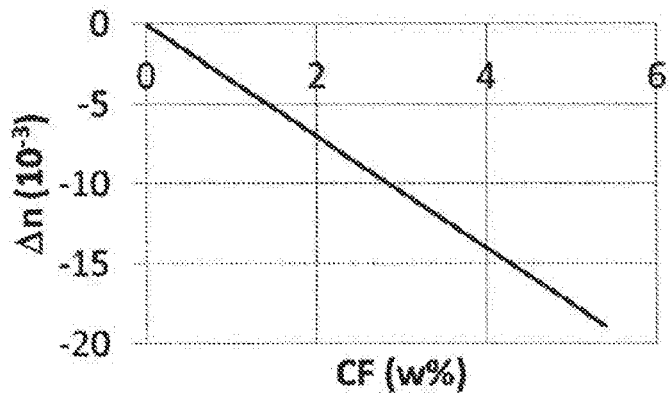
FIG. 1 shows the refractive index difference at 633 nm of Fluorine doped silica.

FIG. 1 illustrates the relationship between the weight ratio [F] (noted as CF on FIG. 1) expressed in wt % and the contribution to the refractive index difference with $SiO_2$. For example, a Fluorine concentration in the glass matrix of 1 wt % allows decreasing the refractive index of pure silica $SiO_2$ of $-3.5 \times 10^{-3}$. According to embodiments of the invention, the concentration of Fluorine at the core center [F] (0) (also noted as $[F]_{r=0}$) is between 0 wt % and 3 wt % the concentration of Fluorine at the core outer radius [F] (α) (also noted as $[F]_{r=\alpha}$) is between 0.5 wt % and 5.5 wt %, with $[F]_{r=\alpha}-[F]_{r=0}>0.4$ wt %. The concentration of Germanium at the core outer radius [Ge] (α) (also noted as $[Ge]_{r=\alpha}$) is between 1.5 mol % and 17.5 mol %.

With such high variations of composition with radius, modal dispersion typically cannot be perfectly compensated by tuning the alpha value. Indeed, the delay is not constant throughout the core radius, whatever the value of alpha, and the time delays do not vary uniformly with wavelength because of change of chromatic dispersion with radius. It entails to use an alpha parameter that varies with core radius to further improve the bandwidth. The central core's graded-index profile n(r) is defined by the following power equation:

$$n(r) = \begin{cases} n_1 \cdot \sqrt{1 - 2\Delta_1 \left(\frac{r}{a}\right)^{\alpha_1}} & 0 \leq r \leq r_t \\ n_2 \cdot \sqrt{1 - 2\Delta_2 \left(\frac{r}{a}\right)^{\alpha_2}} & r_t \leq r \leq a \\ n_{Cl}(r) & a < r \end{cases}$$

where:

$$\Delta_1 = \frac{\alpha_2 \Delta \left(\frac{r_t}{a}\right)^{\alpha_2 - \alpha_1}}{\alpha_1 + (\alpha_2 - \alpha_1)\left(\frac{r_t}{a}\right)^{\alpha_2}},$$

$$\Delta_2 = \frac{\alpha_1 \Delta}{\alpha_1 + (1 - 2\Delta)(\alpha_2 - \alpha_1)\left(\frac{r_t}{a}\right)^{\alpha_2}},$$

$$n_1 = \frac{n_{Cl}}{\sqrt{1 - 2\Delta}}, \text{ and}$$

$$n_2 = n_{Cl} \cdot \sqrt{\frac{(1 - 2\Delta)(\alpha_1 - \alpha_2)\left(\frac{r_t}{a}\right)^{\alpha_2} - \alpha_1}{(1 - 2\Delta)\left((\alpha_1 - \alpha_2)\left(\frac{r_t}{a}\right)^{\alpha_2} - \alpha_1\right)}}.$$

Figure 2:
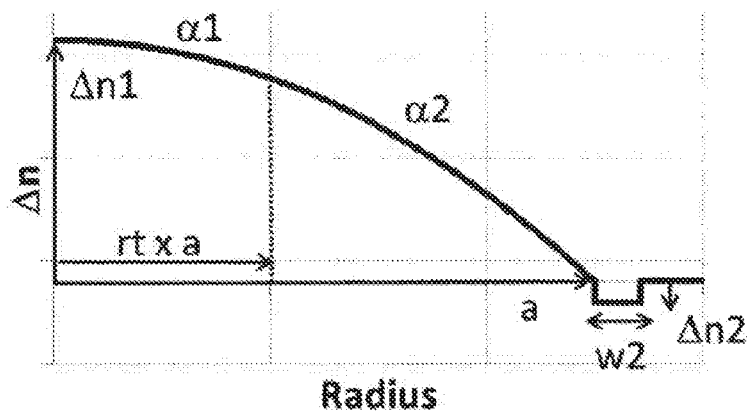
FIG. 2 shows a refractive index profile for an example of an optical fiber according to the invention.

FIG. 2 shows a refractive index profile shape of a multimode fiber according to an embodiment of the invention, expressed as the refractive index difference Δn as a function of the radius. As may be observed, the center core of outer radius a comprises a first inner core showing a graded-index profile with a first $\alpha_1$ value. Such an inner core extends from the center of the core to a transition radius $R_t=r_t\cdot\alpha$. The center core also comprises an outer core showing a graded-index profile with a second $\alpha_2$ value. Such an outer core extends from the transition radius $R_t=r_t\cdot\alpha$ to the outer core radius α.

The core is surrounded by an optical cladding, which comprises an inner layer of depressed refractive index directly surrounding the core, of width $w_2$ and showing a refractive index difference $\Delta n_2$.

Table 1 below discloses some examples of multimode optical fibers according to embodiments of the invention, showing a profile shape according to FIG. 2, and with a core radius of 25 μm.

TABLE 1

| Examples | a (µm) | Δ (%) | Alpha 1 | Alpha 2 | rt | w2 (µm) | Δn2 (10⁻³) | w3 (µm) | Δn3 (10⁻³) | CGe(0) (mol %) | CGe(a) (mol %) | CF(0) (wt %) |
|---|---|---|---|---|---|---|---|---|---|---|---|---|
| Ex. 1 | 25 | 1.0 | 1.980 | 1.981 | 0.60 | 1.4 | −0.8 | 0 | 0 | 18.8 | 13.6 | 1.62 |
| Ex. 2 | 25 | 1.0 | 1.995 | 1.985 | 0.41 | 1.8 | −0.7 | 0 | 0 | 18.0 | 13.5 | 1.37 |
| Ex. 3 | 25 | 1.0 | 1.993 | 2.015 | 0.58 | 1.4 | −0.8 | 0 | 0 | 14.3 | 7.2 | 0.20 |
| Ex. 4 | 25 | 0.8 | 1.998 | 1.960 | 0.25 | 1.8 | −0.7 | 0 | 0 | 17.3 | 16.3 | 2.01 |
| Ex. 5 | 25 | 1.0 | 2.002 | 2.070 | 0.77 | 1.8 | −0.7 | 0 | 0 | 22.6 | 15.3 | 2.85 |
| Ex. 6 | 25 | 1.0 | 1.999 | 1.977 | 0.46 | 1.8 | −0.7 | 0 | 0 | 13.6 | 11.7 | 0.00 |

| Examples | CF(a) (wt %) | optimum wavelength (nm) | EMBc_opt (MHz·km) | operating window EMBc > 4.7 GHz·km (nm) | width of operating window EMBc (nm) | operating window OFL-BW > 3.5 GHz·km (nm) | operating window OFL-BW (nm) |
|---|---|---|---|---|---|---|---|
| Ex. 1 | 4.30 | 1050 | 13365 | 945-1185 | 240 | 905-1170 | 265 |
| Ex. 2 | 4.29 | 950 | 15873 | 840-1080 | 240 | 785-1080 | 295 |
| Ex. 3 | 2.27 | 1050 | 9173 | 980-1160 | 180 | 930-1115 | 185 |
| Ex. 4 | 5.16 | 880 | 14202 | 650-1180 | 530 | 600-1210 | 610 |
| Ex. 5 | 4.85 | 950 | 11896 | 865-1065 | 200 | 800-1065 | 265 |
| Ex. 6 | 3.67 | 950 | 14778 | 845-1075 | 230 | 780-1040 | 260 |

All the examples disclosed in Table 1 have a calculated Effective Modal Bandwidth EMBc>4700 MHz·km and an Overfilled Launch Bandwidth OFL-BW >3500 MHz·km over an operating wavelength range of more than 150 nm centered on the optimum wavelength. This wideband effect is achieved by adding high level of Fluorine concentration in the core of the multimode fiber, combined with a "double-alpha" shape, with parameters $\alpha_1$, $\alpha_2$ and $r_t$ chosen to maximize the EMBc value at the optimum wavelength.

Figure 3:
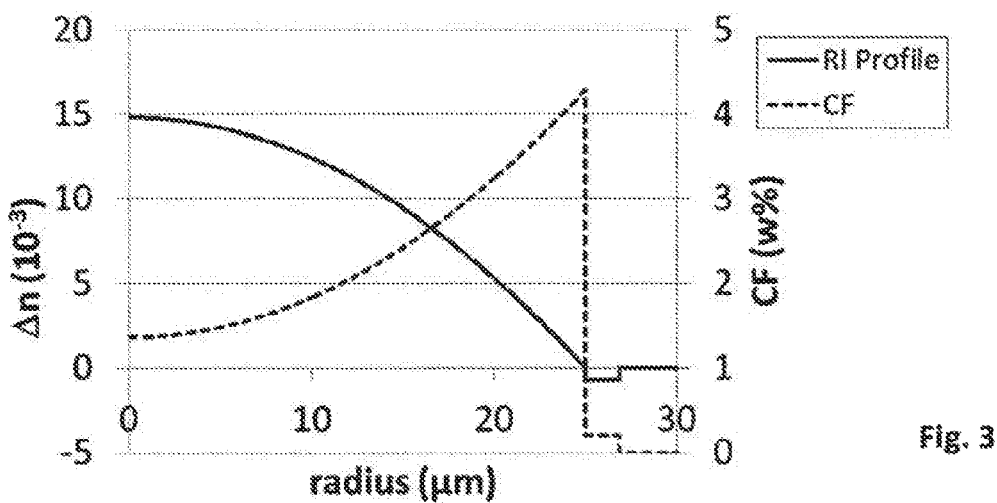
FIG. 3 shows the refractive index profile and Fluorine concentration profile for an example (Example 1) of an optical fiber according to the invention.

FIG. 3 shows the refractive index profile (noted as RI profile) and the Fluorine concentration profile (noted as CF) of the first example embodiment of the invention, called Ex.1, mentioned in Table 1 above.

Table 2 below presents some comparative examples, which, on the contrary to the examples in Table 1 above, are all out of the scope of the present invention.

TABLE 2

| Examples | a (µm) | Δ (%) | Alpha 1 | Alpha 2 | rt | w2 (µm) | Δn2 (10⁻³) | w3 (µm) | Δn3 (10⁻³) | CGe(0) (mol %) | CGe(a) (mol %) | CF(0) (wt %) |
|---|---|---|---|---|---|---|---|---|---|---|---|---|
| Ex. 1c | 25 | 1.0 | 2.045 | 2.045 | — | 1.8 | −0.7 | 0 | 0 | 13.6 | 0.0 | 0.00 |
| Ex. 2c | 25 | 1.0 | 1.985 | 1.985 | — | 0.9 | −0.2 | 0 | 0 | 0 | 13.3 | 0.00 |
| Ex. 3c | 25 | 1.0 | 2.040 | 2.060 | 0.64 | 1.8 | −0.7 | 0 | 0 | 13.6 | 0.0 | 0.00 |
| Ex. 4c | 25 | 1.0 | 2.060 | 2.070 | 0.75 | 1.8 | −0.7 | 0 | 0 | 22.6 | 9.1 | 2.85 |

| Examples | CF(a) (wt %) | optimum wavelength (nm) | EMBc_opt (MHz·km) | operating window EMBc > 4.7 GHz·km (nm) | width of operating window EMBc (nm) | operating window OFL-BW > 3.5 GHz·km (nm) | operating window OFL-BW (nm) |
|---|---|---|---|---|---|---|---|
| Ex. 1c | 0.00 | 950 | 15129 | 890-1015 | 125 | 875-995 | 120 |
| Ex. 2c | 4.20 | 950 | 6950 | 875-1030 | 155 | 775-975 | 200 |
| Ex. 3c | 0.00 | 950 | 9598 | 900-1010 | 110 | 865-995 | 130 |
| Ex. 4c | 2.85 | 950 | 15149 | 900-1015 | 115 | 885-1015 | 130 |

Comparative example Ex.1c in Table 2 has the same refractive index as example Ex.2 in Table 1, but the core of the multimode fiber of example Ex.1c is only doped with Germanium. There is no Fluorine in the graded-index core. Furthermore, a single alpha (that is to say $\alpha_1 = \alpha_2$) has been chosen to maximize the calculated effective modal bandwidth EMBc at 950 nm. This optimum value is very close to the optimum value of EMBc of example Ex.2. But it drastically decreases when the fiber is used at another wavelength than 950 nm. Therefore, the width of the operating window where the multimode fiber of example Ex.1c has an EMBc larger than 4700 MHz·km is only 125 nm, while it is extended over 240 nm for example Ex.2, which has a concentration of 1.37 wt % of Fluorine at the core center and 4.29 wt % at the outer radius of the core.

The multimode optical fiber of comparative example Ex.3c in Table 2 is also only doped with germanium in the core, with the same refractive index as example Ex.2 in Table 1 and Ex.1c in Table 2, but with a double-alpha shape. However, as can be observed from the bandwidth results shown in Table 2, there is no gain to use a double-alpha profile when the core is only doped with germanium, without any Fluorine doping. The optimum calculated effective modal bandwidth EMBc is around 950 nm like in examples Ex. 2 and Ex. 1c, but with a maximum value lower than the one obtained with examples Ex.2 and Ex.1c. Here again, the width of the operating window for EMBc>4700 MHz·km is much narrower than for example Ex.2.

Figure 4:
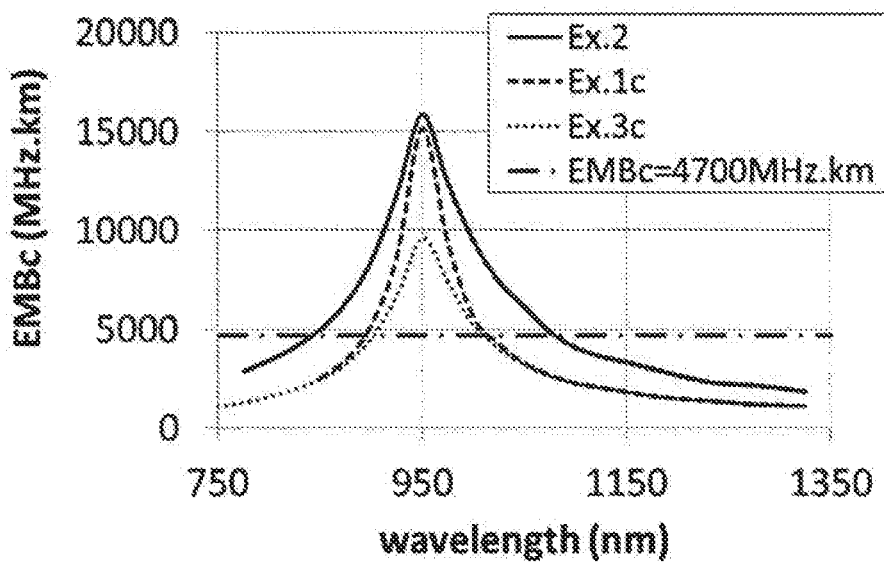
FIG. 4 shows the calculated effective modal bandwidth (EMBc) for several multimode fibers corresponding or not to embodiments of the invention.

FIG. 4 represents the variation of the calculated effective modal bandwidth EMBc (expressed in MHz·km) with wavelength (expressed in nm) for example Ex.2, corresponding to an embodiment of the invention, as shown in Table 1, and for comparative examples Ex.1c and Ex.3c, which are out of the scope of the invention, as shown in Table 2. The EMBc limit of 4700 MHz·km is also added for comparison. As may be observed from FIG. 4, the multimode fiber of example Ex.

2 achieves by far the wider continuous operating wavelength range for which the calculated effective modal bandwidth (EMBc) is greater than 4700 MHz·km.

The multimode optical fiber of comparative example Ex.4c in Table 2 has a core, which is highly co-doped with Ge and F, and the parameters $\alpha_1$, $\alpha_2$ and $r_t$ have been tuned to maximize the calculated effective modal bandwidth EMBc at 950 nm. However, although the multimode fiber of example Ex.4c shows the same refractive index profile and the same level of co-doping at the center of the core as example Ex.5 in Table 1, the concentration of fluorine is constant along the radius within the graded-index core. As a consequence, the width of the operating window of Ex. 4c with EMBc>4700 MHz·km is only of 130 nm (instead of 200 nm for example Ex.5 in Table 1).

The multimode optical fiber of comparative example Ex.2c in Table 2 is a multimode optical fiber, which graded-index core is only doped with Fluorine. There is no Germanium in the graded-index core. Furthermore, a single alpha ($\alpha_1=\alpha_2$) and the parameters $w_2$ and $\Delta n_2$ of the depressed-cladding layer at the core-cladding interface have been chosen to maximize the calculated effective modal bandwidth EMBc at 950 nm. While this embodiment allows reaching a wavelength-operating window, in which the overfilled launch bandwidth OFL-BW is greater than 3500 M Hz·km, with 200 nm width, such a full-fluorine multimode optical fiber does not allow to reach calculated effective modal bandwidth EMBc larger than 6950 M Hz·km. The wavelength-operating window for calculated effective modal bandwidth EMBc larger than 4700 MHz·km is not larger than 155 nm. Such a wavelength operating range is much narrower than the one, which can be achieved in embodiments of the present invention, thanks to the combined use of high levels of both germanium and fluorine in the graded-index core, with an alpha-shape of refractive index, which varies with radius.

Furthermore, in example Ex. 2c, which is a multimode optical fiber with a graded-index core only doped with Fluorine, the outer part of the core has a refractive index $n_{outer\ core}$ much lower than the refractive index of silica $n_{silica}$, such as:

$$n_{outer\ core} - n_{silica} = -14.7 \times 10^{-3}.$$

As a consequence, and in order to keep a cladding refractive index at the level of the outer part of the core, it is required to highly dope the outer cladding with fluorine. Such a refractive index profile is very complex to achieve, especially for deposition processes like MCVD and PCVD, which require depositing the different doped layers within a substrate tube. It is hence necessary to manage leakage losses and/or to add an outer depressed-cladding.

Furthermore, with a Fluorine-doped outer cladding, it becomes difficult to consider "trench-assisted" concepts that require to further F-dope the cladding. It would require fluorine concentration levels that can difficultly be reached with the existing deposition processes. As a mere example, the multimode optical fiber of example Ex. 2c would require a fluorine weight ratio greater than circa 5 wt %, in order to add a trench showing a refractive index difference $\Delta n_3$ smaller than $-1 \times 10^{-3}$.

Figure 5:
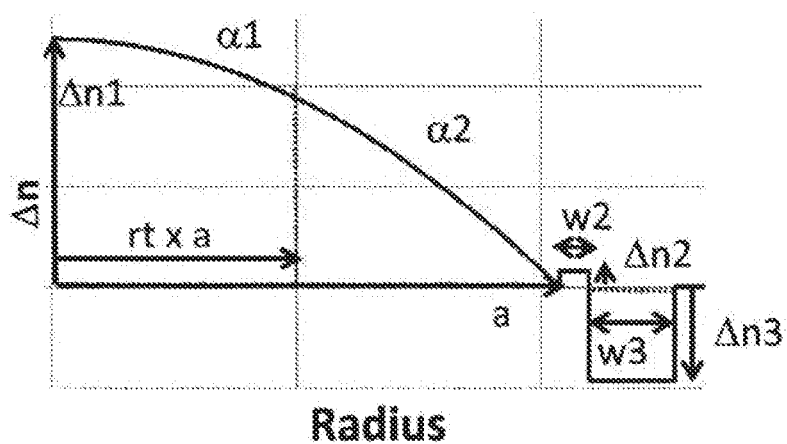
FIG. 5 shows a refractive index profile for another example of an optical fiber according to the invention.

FIG. 5 illustrates the refractive index profile of a multimode optical fiber according to a second embodiment of the invention.

In this second embodiment, a trench of refractive index difference $\Delta n_3$ and width $w_3$ can be added after the inner cladding layer of refractive index difference $\Delta n_2$ and width $w_2$, which is directly surrounding the optical core, in order to improve the bending loss performances of the multimode optical fiber.

Table 3 below discloses four multimode optical fibers (examples Ex. 7 to Ex. 10) according to embodiments of the present invention, all showing a trench-assisted refractive index profile according to FIG. 5. Table 3 also discloses a comparative example Ex. 5c, which is out of the scope of the present invention, although it also presents a refractive index profile according to FIG. 5. All the multimode optical fibers listed in Table 3 have a core radius of 25 μm.

TABLE 3

| Examples | a (μm) | Δ (%) | Alpha 1 | Alpha 2 | rt | w2 (μm) | Δn2 ($10^{-3}$) | w3 (μm) | Δn3 ($10^{-3}$) | CGe(0) (mol %) | CGe(a) (mol %) | CF(0) (wt %) |
|---|---|---|---|---|---|---|---|---|---|---|---|---|
| Ex. 7 | 25 | 1.0 | 1.979 | 1.906 | 0.47 | 1.4 | 0.2 | 4.2 | −5.5 | 19.6 | 16.3 | 1.87 |
| Ex. 8 | 25 | 1.0 | 1.950 | 1.951 | 0.23 | 1.4 | 0.2 | 4.2 | −5.5 | 14.9 | 15.7 | 0.41 |
| Ex. 9 | 25 | 1.0 | 2.033 | 1.986 | 0.26 | 1.4 | 0.2 | 4.2 | −5.5 | 13.6 | 10.3 | 0.00 |
| Ex. 10 | 25 | 1.0 | 2.020 | 1.989 | 0.28 | 1.7 | −0.2 | 3.5 | −6 | 15.5 | 10.8 | 0.46 |
| Ex. 5c | 25 | 1.1 | 2.035 | 2.035 | — | 1.2 | −0.08 | 4.4 | −6.86 | 15.3 | 2.8 | 0.00 |

| Examples | CF(a) (wt %) | optimum wavelength (nm) | EMBc_opt (MHz · km) | operating window EMBc > 4.7 GHz · km (nm) | width of operating window EMBc (nm) | operating window OFL-BW > 3.5 GHz · km (nm) | operating window OFL-BW (nm) |
|---|---|---|---|---|---|---|---|
| Ex. 7 | 5.16 | 950 | 15554 | 800-1120 | 320 | 725-1140 | 415 |
| Ex. 8 | 4.96 | 1000 | 6577 | 895-1135 | 240 | 665-1150 | 485 |
| Ex. 9 | 3.42 | 1000 | 15442 | 905-1115 | 210 | 880-1125 | 245 |
| Ex. 10 | 3.42 | 1000 | 17433 | 900-1115 | 215 | 870-1120 | 250 |
| Ex. 5c | 0.85 | 950 | 10735 | 900-1010 | 110 | 890-965 | 75 |

Figure 6:
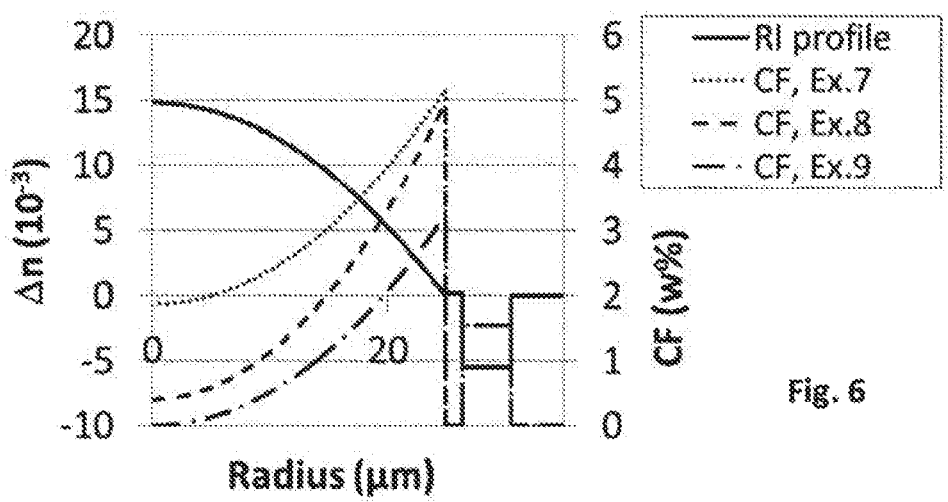
FIG. 6 shows the refractive index profile and Fluorine concentration profiles for several examples (Examples 7, 8 and 9) of an optical fiber according to the invention.

As may be observed from Table 3, examples Ex.7, Ex.8 and Ex.9 have three different Fluorine concentration profiles, which are shown in FIG. 6, which illustrates the weight ratio of fluorine CF, expressed in wt %, as a function of the radius expressed in microns. More precisely, the multimode optical fibers of examples Ex.7, Ex.8 and Ex.9 have the same refractive index profile (shown on FIG. 6), but exhibit different $\alpha_1$, $\alpha_2$ and $r_t$ values, which are chosen so as to maximize the calculated effective modal bandwidth EMBc at the optimum wavelength, in accordance with their Fluorine concentration.

All the examples of multimode fibers according to embodiments of the invention listed in Table 3 have a continuous operating wavelength range greater than 200 nm, over which the calculated effective modal bandwidth EMBc is greater than 4700 MHz·km.

By comparing performances of the exemplary embodiments in Table 1 and Table 3, one may observe that the addition of a trench in the outer cladding, with width $w_2$ and height $\Delta n_2$ tuned accordingly to the trench dimension, does not limit the width of the operating window, when Fluorine and Ge concentration levels are sufficiently high.

The multimode optical fiber of example Ex.10 in Table 3 has a refractive index profile, which differs from that of examples Ex.7, Ex.8 and Ex.9. It however shows bandwidth performances similar to that of example Ex.9, but with another fluorine concentration profile. The multimode optical fiber of example Ex. 10 also corresponds to an exemplary embodiment of the present invention.

On the contrary, comparative example Ex.5c is out of the scope of the present invention. Such a multimode optical fiber has a single-alpha graded-index core ($\alpha_1=\alpha_2$), which contains 0.85 wt % of Fluorine at the outer radius of the core, and an inner cladding layer directly surrounding the core with parameters $\Delta n_2$ and $w_2$ tuned to maximize the calculated effective modal bandwidth EMBc at 950 nm. However, as may be observed from the results in Table 3, such features do not allow to reach an operating window, in which the EMBc is greater than 4700 MHz·km, larger than 110 nm; as regards the operating wavelength range, over which the overfilled launch bandwidth is greater than 3.5 GHz·km, it is not larger than 75 nm.

Table 4 below discloses other examples (Ex. 11, Ex. 12 and Ex. 13) according to embodiments of the present invention, corresponding to multimode optical fibers with core radius $\alpha=40$ μm, as well as a comparative example Ex. 6c.

at the outer radius of the core: [F](a)=3.63 wt %. As a consequence, the width of the operating window has been extended over 300 nm, from 780 nm to 1080 nm.

Figure 7:
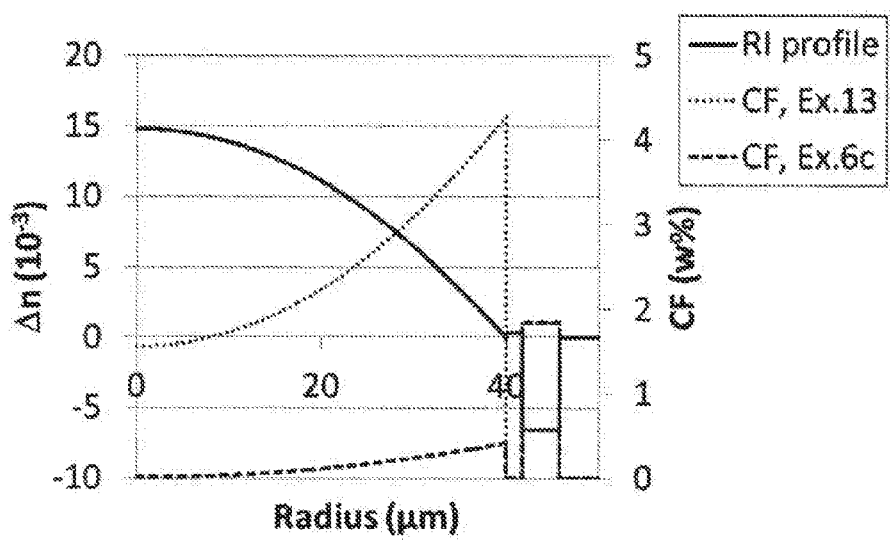
FIG. 7 shows the refractive index profile and Fluorine concentration profile for an example (Example 13) of an optical fiber according to the invention and for a comparative optical fiber out of the scope of the invention.

FIG. 7 shows the refractive index profile (RI profile) and the Fluorine concentration (CF) as a function of radius, for the multimode optical fibers of example Ex.13 and comparative example Ex.6c listed in Table 4. The multimode optical fibers of examples Ex.13 and Ex.6c thus exhibit the same refractive index profile, as can be deduced from both FIG. 7 and Table 4, but they show different fluorine concentration profiles along the radius.

As one can observe again, the addition of a trench in the outer cladding to improve the bending performances of the graded-index multimode fiber (corresponding to example Ex. 13) does not prevent from extending the operating window around 300 nm, when both germanium and fluorine concentrations are sufficiently high.

Figure 8:
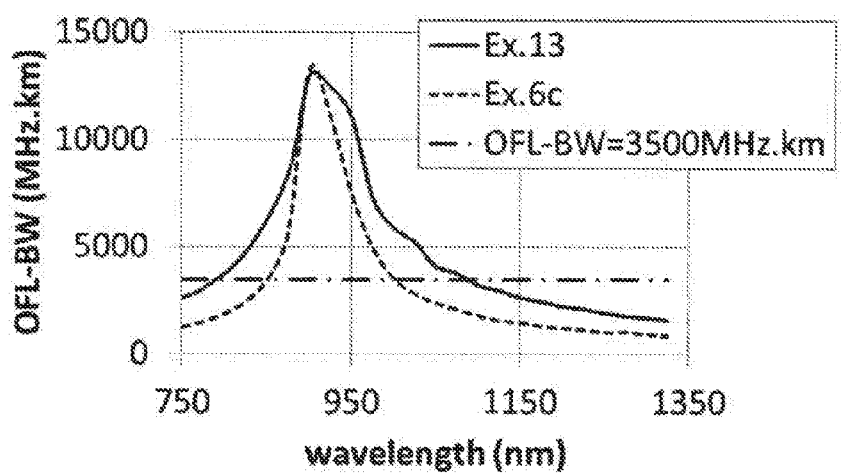
FIG. 8 shows the overfilled launch bandwidth (OFL-BW) for an example (Example 13) of an optical fiber according to the invention and for a comparative optical fiber out of the scope of the invention.

FIG. 8 illustrates the overfilled launch bandwidth of the multimode fibers of examples Ex. 13 and Ex. 6c, expressed in MHz·km as a function of wavelength (expressed in nm). The OFL-BW limit of 3500 MHz·km is also added for comparison.

The graded-index multimode fiber of comparative example Ex. 6c has the same refractive index as the fiber of example Ex. 13, but has a low fluorine concentration, and a single-alpha ($\alpha_1=\alpha_2$) graded-index core, where the alpha parameter is tuned to optimize the bandwidth peak around 900 nm. As can be seen on FIG. 8, such features do not allow to exceed 150 nm of continuous operating wavelength range, over which the overfilled launch bandwidth OFL-BW is greater than 3500 MHz·km.

TABLE 4

| Examples | a (μm) | Δ (%) | Alpha 1 | Alpha 2 | rt | $w_2$ (μm) | $\Delta n_2$ ($10^{-3}$) | $w_3$ (μm) | $\Delta n_3$ ($10^{-3}$) | CGe(0) (mol %) |
|---|---|---|---|---|---|---|---|---|---|---|
| Ex. 11 | 40 | 1.0 | 2.040 | 2.070 | 0.85 | 1.8 | −0.7 | 0 | 0 | 15.0 |
| Ex. 12 | 40 | 1.0 | 2.002 | 1.979 | 0.50 | 1.8 | −0.7 | 0 | 0 | 15.0 |
| Ex. 13 | 40 | 1.0 | 1.999 | 1.987 | 0.43 | 1.7 | 0.4 | 4 | −6.5 | 18.6 |
| Ex. 6c | 40 | 1.0 | 2.045 | 2.045 | — | 1.7 | 0.4 | 4 | −6.5 | 13.7 |

| Examples | CGe(a) (mol %) | CF(0) (w %) | CF(a) (w %) | optimum wavelength (nm) | OFL-BW_opt (MHz · km) | operating window OFL-BW > 3.5 GHz · km (nm) | width of operating window OFL-BW (nm) |
|---|---|---|---|---|---|---|---|
| Ex. 11 | 2.7 | 0.43 | 0.85 | 925 | 12201 | 855-1020 | 165 |
| Ex. 12 | 11.6 | 0.43 | 3.63 | 925 | 14563 | 780-1080 | 300 |
| Ex. 13 | 13.6 | 1.56 | 4.29 | 900 | 12975 | 790-1090 | 300 |
| Ex. 6c | 1.4 | 0.00 | 0.42 | 900 | 13231 | 850-1000 | 150 |

As may be observed in Table 4, example Ex.11 is a graded-index multimode optical fiber with parameters $\alpha_1$, $\alpha_2$, $r_t$, $\Delta n_2$ and $w_2$ chosen so as to maximize the overfilled launch bandwidth OFL-BW at a wavelength of 925 nm. An accurate tuning of the weight ratio of fluorine, with [F](0)= 0.43 wt % at the center of the core and [F](a)=0.85 wt % at the outer core radius, allows to keep an overfilled launch bandwidth OFL-BW greater than 3500 M Hz·km over a continuous wavelength range extending from 855 nm to 1020 nm.

Figure 9:
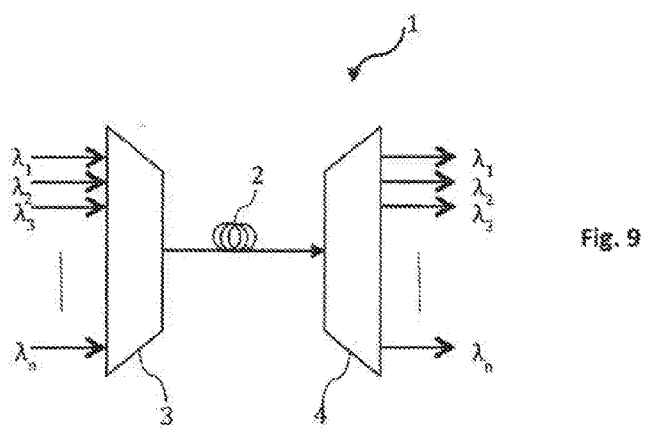
FIG. 9 is a schematic diagram of an exemplary wavelength division multiplexing system according to the present invention.

Example Ex.12 shows the same refractive index profile and the same Fluorine concentration at the center of the core as example Ex. 11. The parameters $\alpha_1$, $\alpha_2$, and $r_t$ are also chosen to maximize the overfilled launch bandwidth OFL-BW at a wavelength of 925 nm. However, the multimode fiber of example Ex. 12 has a higher Fluorine concentration FIG. 9 is a schematic diagram illustrating a wavelength division multiplexing system according to an embodiment of the present invention. A wavelength division multiplexing system 1 includes a multiplexer (MUX) 3 and a demultiplexer (DEMUX) 4 that are coupled via a multimode optical fiber 2 according to one of the previously described embodiments of the invention. In wavelength division multiplexing system 1, after optical signals with various wavelengths $\lambda_1$, $\lambda_2$, . . . , $\lambda_n$ are multiplexed by the multiplexer 3, the multiplexed signal is transmitted through the multimode optical fiber 2 and is demultiplexed by the demultiplexer 4.

The invention claimed is:
1. A multimode optical fiber, comprising:
a central core surrounded by an optical cladding, said central core having (i) an outer radius a, (ii) a transition radius $R_t = \alpha \cdot r_t$ that is less than the outer radius a, (iii) a maximum refractive index $n_0$, (iv) a minimum refractive index $n_{cl}$, and (v) a graded-index profile n(r) that is a function of the radial distance r from the center of said central core, wherein said central core is co-doped with at least fluorine F and germanium $GeO_2$, wherein said central core's graded-index profile n(r) is defined by the following equation:

$$n(r) = n_0 \sqrt{1 - 2\Delta \left(\frac{r}{a}\right)^{\alpha(r)}}$$

where:

$$\Delta = \frac{(n_0^2 - n_{Cl}^2)}{2n_0^2}$$

wherein the alpha parameter α(r) is a function of the radial distance r from the center of said central core, said alpha parameter α(r) having two or more different values along radial positions from said central core's center to said central core's outer radius a;

wherein the weight ratio of fluorine F at the core center $([F]_{r=0})$ is between 0 and 3 wt % and the weight ratio of fluorine F at the core outer radius $([F]_{r=a})$ is between 0.5 wt % and 5.5 wt %, with $[F]_{r=a} - [F]_{r=0} > 0.4$ wt %;

wherein the mole fraction of $GeO_2$ at the core outer radius $([Ge]_{r=a})$ is between 1.5 mol % and 17.5 mol %; and wherein said optical cladding comprises a trench, a region of depressed refractive index $n_{trench}$.

2. The multimode optical fiber according to claim 1, wherein said trench directly surrounds the optical core and has a width $w_2$ between about 0.4 µm and 2.5 µm.

3. The multimode optical fiber according to claim 1, wherein the trench-cladding index difference $\Delta n_2 = n_{trench} - n_{Cl}$ is between about $-2.0 \times 10^{-3}$ and 0.

4. The multimode optical fiber according to claim 1, wherein said optical cladding comprises an inner cladding layer directly surrounding said core, said inner cladding layer having a width $w_2$ and a refractive index difference $\Delta n_2$, and wherein said trench directly surrounds said inner cladding layer, said trench having a width $w_3$ and a refractive index difference $\Delta n_3 = n_{trench} - n_{Cl}$.

5. The multimode optical fiber according to claim 4, wherein said width $w_2$ of said inner cladding layer is between about 0.4 µm and 2.5 µm.

6. The multimode optical fiber according to claim 4, wherein said refractive index difference $\Delta n_2$ is between about $-1.5 \times 10^{-3}$ and $1.5 \times 10^{-3}$.

7. The multimode optical fiber according to claim 4, wherein said width $w_3$ of said trench is between about 1.5 µm and 5.0 µm.

8. The multimode optical fiber according to claim 4, wherein said refractive index difference $\Delta n_3$ is between about $-7.5 \times 10^{-3}$ and $-1.5 \times 10^{-3}$.

9. The multimode optical fiber according to claim 1, wherein Δ is between 0.7% and 1.5%.

10. The multimode optical fiber according to claim 1, wherein the mole fraction of $GeO_2$ at the core center $([Ge]_{r=0})$ is between 9.5 mol % and 30 mol %.

11. The multimode optical fiber according to claim 1, wherein, for a radial position less than said central core's transition radius $R_t$, the alpha-parameter α(r) has a first value $\alpha_1$, and wherein, for a radial position greater than said central core's transition radius $R_t$, the alpha-parameter α(r) has a second value $\alpha_2$.

12. The multimode optical fiber according to claim 11, wherein said central core's graded-index profile is defined by the following power equation:

$$n(r) = \begin{cases} n_1 \cdot \sqrt{1 - 2\Delta_1 \left(\frac{r}{a}\right)^{\alpha_1}} & 0 \leq r \leq r_t \\ n_2 \cdot \sqrt{1 - 2\Delta_2 \left(\frac{r}{a}\right)^{\alpha_2}} & r_t \leq r \leq a \\ n_{Cl}(r) & a < r \end{cases}$$

where $$\Delta_1 = \frac{\alpha_2 \Delta \left(\frac{r_t}{a}\right)^{\alpha_2 - \alpha_1}}{\alpha_1 + (\alpha_2 - \alpha_1)\left(\frac{r_t}{a}\right)^{\alpha_2}},$$

$$\Delta_2 = \frac{\alpha_1 \Delta}{\alpha_1 + (1 - 2\Delta)(\alpha_2 - \alpha_1)\left(\frac{r_t}{a}\right)^{\alpha_2}},$$

$$n_1 = \frac{n_{Cl}}{\sqrt{1 - 2\Delta}}, \text{ and}$$

$$n_2 = n_{Cl} \cdot \sqrt{\frac{(1 - 2\Delta)(\alpha_1 - \alpha_2)\left(\frac{r_t}{a}\right)^{\alpha_2} - \alpha_1}{(1 - 2\Delta)\left((\alpha_1 - \alpha_2)\left(\frac{r_t}{a}\right)^{\alpha_2} - \alpha_1\right)}}.$$

13. The multimode optical fiber according to claim 11, wherein the first alpha-value $\alpha_1$ is between about 1.945 and 2.07.

14. The multimode optical fiber according to claim 11, wherein the second alpha-value $\alpha_2$ is between about 1.945 and 2.07 with $0.001 |\alpha_1 - \alpha_2| 0.1$.

15. The multimode optical fiber according to claim 1, wherein said parameter $r_t$ of the transition radius is between about 0.2 and 0.9.

16. The multimode optical fiber according to claim 1, wherein said center core's outer radius a is between about 20 µm and 40 µm.

17. The multimode optical fiber according to claim 1, wherein the weight ratio of fluorine F [F] (r) is a function of the radial distance r from the center of said central core expressed as:

$$[F](r) = [F]_{r=0} + \left(\frac{r}{a}\right)^p \cdot ([F]_{r=a} - [F]_{r=0})$$

where p is a constant substantially equal to 2.

18. A multimode optical fiber, comprising:

a central core surrounded by an optical cladding, said central core having (i) an outer radius a, (ii) a transition radius $R_t = \alpha \cdot r_t$ that is less than the outer radius a, (iii) a maximum refractive index $n_0$, (iv) a minimum refractive index $n_{cl}$, and (v) a graded-index profile n(r) that is a function of the radial distance r from the center of said central core, wherein said central core is co-doped with at least fluorine F and germanium $GeO_2$, wherein said central core's graded-index profile n(r) is defined by the following equation:

$$n(r) = n_0 \sqrt{1 - 2\Delta\left(\frac{r}{a}\right)^{\alpha(r)}}$$

where:

$$\Delta = \frac{(n_0^2 - n_{Cl}^2)}{2n_0^2}$$

wherein the alpha parameter $\alpha(r)$ is a function of the radial distance r from the center of said central core, said alpha parameter $\alpha(r)$ having two or more different values along radial positions from said central core's center to said central core's outer radius a;

wherein the weight ratio of fluorine F at the core center ($[F]_{r=0}$) is between 0 and 3 wt % and the weight ratio of fluorine F at the core outer radius ($[F]_{r=a}$) is between 0.5 wt % and 5.5 wt %, with $[F]_{r=a} - [F]_{r=0} > 0.4$ wt %;

wherein the weight ratio of fluorine F [F] (r) is a function of the radial distance r from the center of said central core expressed as:

$$[F](r) = [F]_{r=0} + \left(\frac{r}{a}\right)^p \cdot ([F]_{r=a} - [F]_{r=0})$$

where p is a constant substantially equal to 2; and wherein said optical cladding comprises a trench, a region of depressed refractive index $n_{trench}$.

19. The multimode optical fiber according to claim 18, wherein said trench directly surrounds the optical core and has a width $w_2$ between about 0.4 μm and 2.5 μm.

20. The multimode optical fiber according to claim 18, wherein said optical cladding comprises an inner cladding layer directly surrounding said core, said inner cladding layer having a width $w_2$ between about 0.4 μm and 2.5 μm and a refractive index difference $\Delta n_2$, and wherein said trench directly surrounds said inner cladding layer, said trench having a width $w_3$ between about 1.5 μm and 5.0 μm and a refractive index difference $\Delta n_3 = n_{trench} - n_{Cl}$.

* * * * *

UNITED STATES PATENT AND TRADEMARK OFFICE
CERTIFICATE OF CORRECTION

PATENT NO. : 9,835,796 B2
APPLICATION NO. : 15/586664
DATED : December 5, 2017
INVENTOR(S) : Bigot et al.

It is certified that error appears in the above-identified patent and that said Letters Patent is hereby corrected as shown below:

In the Specification

Column 1, delete Line 18 and insert: -- IB2014/000503 for Multimode Optical Fiber with High --

Column 4, delete Line 27 and insert: -- 0.5 wt % and 5.5 wt %, with $[F]_{r=a} - [F]_{r=0} > 0.4 wt\%$. --

Column 4, delete Line 50 and insert: -- bandwidth (EMBc) greater than 4700 MHz.km over a --

Column 5, delete Line 57 and insert: -- wt % and 5.5 wt %, with $[F]_{r=a} - [F]_{r=0} > 0.85 wt\%$. --

Column 7, delete Line 34 and insert: -- tive index $n_{cl}$ and (v) a graded-index profile n(r) that is a --

Column 9, Table 1, for row "Ex. 2" at column "Alpha 2," delete "1.985" and insert: -- 1.986 --

Column 9, Table 1, delete heading on last column and insert: -- width of operating window OFL-BW (nm) --

Column 9, Table 2, delete heading on last column and insert: -- width of operating window OFL-BW (nm) --

Column 12, Table 3, for row "Ex. 7" at column "Alpha 2," delete "1.906" and insert: -- 1.966 --

Column 12, Table 3, for row "Ex. 9" at column "CF(a) (wt%)," delete "3.42" and insert: -- 3.24 --

Column 12, Table 3, delete heading on last column and insert: -- width of operating window OFL-BW (nm) --

In the Claims

Claim 14, delete Line 37 and insert: -- and 2.07 with $0.001 \leq |\alpha_1 - \alpha_2| \leq 0.1$. --

Signed and Sealed this
Tenth Day of April, 2018

Andrei Iancu
*Director of the United States Patent and Trademark Office*